(12) United States Patent
Movsisyan

(10) Patent No.: US 11,102,141 B2
(45) Date of Patent: *Aug. 24, 2021

(54) OUTBOUND REQUEST MANAGEMENT

(71) Applicant: VMware, Inc., Palo Alto, CA (US)

(72) Inventor: Vardan Movsisyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/451,037

(22) Filed: Jun. 25, 2019

(65) Prior Publication Data

US 2019/0312822 A1 Oct. 10, 2019

Related U.S. Application Data

(63) Continuation of application No. 15/356,347, filed on Nov. 18, 2016, now Pat. No. 10,348,636.

(51) Int. Cl.
*H04L 12/911* (2013.01)
*H04L 29/12* (2006.01)
*H04L 29/08* (2006.01)

(52) U.S. Cl.
CPC .......... *H04L 47/70* (2013.01); *H04L 61/1511* (2013.01); *H04L 67/2814* (2013.01)

(58) Field of Classification Search
None
See application file for complete search history.

(56) References Cited

U.S. PATENT DOCUMENTS

| | | | | |
|---|---|---|---|---|
| 6,667,968 B1 * | 12/2003 | Tran | .................... | H04L 12/2854 370/352 |
| 7,023,863 B1 * | 4/2006 | Naudus | ................... | H04L 63/02 370/352 |
| 7,103,664 B1 * | 9/2006 | Novaes | ............... | H04L 67/1008 709/203 |
| 2002/0101879 A1 * | 8/2002 | Bouret | ................... | H04L 67/16 370/465 |
| 2005/0038905 A1 * | 2/2005 | Banes | ............... | H04L 29/08576 709/238 |
| 2008/0215754 A1 * | 9/2008 | Belimpasakis | ..... | H04L 61/6022 709/245 |
| 2009/0024761 A1 * | 1/2009 | Li | ........................ | H04L 29/1216 709/244 |
| 2010/0218247 A1 * | 8/2010 | Nice | ..................... | H04W 12/00 726/12 |
| 2010/0272107 A1 * | 10/2010 | Papp | ................. | H04L 29/12028 370/392 |
| 2012/0078692 A1 * | 3/2012 | Dugard | ............... | H04L 65/1006 705/14.4 |

(Continued)

*Primary Examiner* — Brian Whipple

(57) ABSTRACT

The present disclosure is related to devices, systems, and methods for routing requests for an external service, originating from a plurality of cluster nodes, through an outbound request manager. An example method can include receiving a first request for an external service originating from a first cluster node having a first network address, receiving a second request for the external service originating from a second cluster node having a second network address, transmitting the first request with a particular network address to an address associated with the external service, and transmitting the second request with the particular network address to the address associated with the external service.

16 Claims, 3 Drawing Sheets

(56) References Cited

U.S. PATENT DOCUMENTS

| | | | |
|---|---|---|---|
| 2013/0103834 A1* | 4/2013 | Dzerve | H04L 61/2557 709/225 |
| 2014/0280998 A1* | 9/2014 | Richards | H04L 45/306 709/230 |
| 2016/0381431 A1* | 12/2016 | Patterson | H04L 67/02 725/110 |
| 2017/0187789 A1* | 6/2017 | Guerin | H04L 67/1004 |

* cited by examiner

OUTBOUND REQUEST MANAGEMENT

RELATED APPLICATIONS

This application is a Continuation Applications which claims priority from U.S. patent application Ser. No. 15/356,347, filed Nov. 18, 2016, entitled "OUTBOUND REQUEST MANAGEMENT".

BACKGROUND

A plurality of cluster nodes providing a same or similar functionality can exist in a network. Requests for an external service can originate from the plurality of cluster nodes.

DETAILED DESCRIPTION

Figure 1:
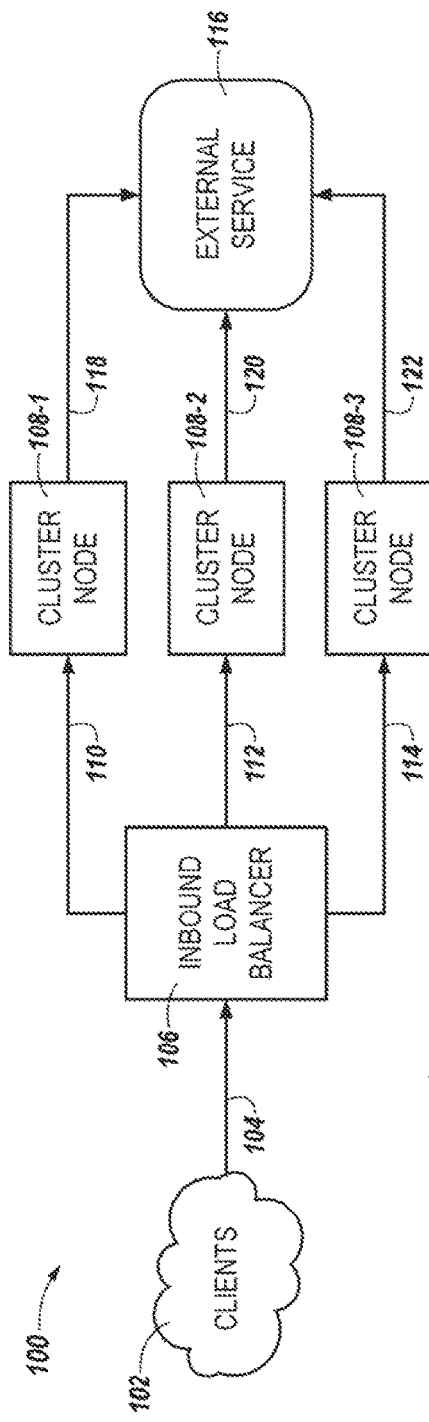
FIG. 1 is a general logical diagram of an infrastructure according to previous approaches.

An outbound request manager, coupled to a plurality of cluster nodes, can be configured to transmit requests for an external service originating from any of the plurality of cluster nodes to an address associated with the external service such that the external service identifies the requests as originating from a particular network address, such as an Internet Protocol (IP) address. By routing the requests through an outbound request manager, an external service can identify the requests as originating from a single and unchanging network address. As used herein, "external service" refers to a service provided by a network entity whose entry point for the plurality of cluster nodes requesting the service is outside of the IP addresses of the cluster. As used herein, "clients" refers to hardware or software that accesses the plurality of cluster nodes for a service provided by the plurality of cluster nodes (described further below). Examples of an external service can include, but are not limited to, an authentication service, a Domain Name System (DNS) service, and a Network Time Protocol (NTP) service.

In some instances, a cluster may comprise a large quantity of cluster nodes (e.g., on the order of hundreds or thousands of cluster nodes). Large quantities of cluster nodes, may complicate the management of traffic therefrom. For example, in some previous approaches the external service may have explicit firewall rules to permit traffic from the network address of each of the cluster nodes. Information retrieved via an external service that is associated with a first request from a first cluster node may be useful with a second request from a second cluster node. However, in some previous approaches, the information may still be retrieved for each request via the external service.

To alleviate these shortcomings, the present disclosure is directed towards routing requests for an external service, originating from a plurality of cluster nodes, through an outbound request manager such that the external service identifies the requests as originating from a particular network address. Stated another way, instead of the external service identifying each request as originating from the network address of the cluster node from which the request originates, embodiments herein can enable the external service to identify all of the requests as originating from one particular network address.

As a result, the external service can have a single firewall rule permitting the particular network address as opposed to having multiple firewall rules, one rule for each network address of each of the cluster nodes permitting each network address. In some embodiments, the outbound request manager can cache information associated with a first request for an external service from a first cluster node and utilize the cached information in response to receipt of a second request from a second cluster node.

As referred to herein, the term "cluster node" can sometimes refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a cluster (e.g., a software defined data center). In such a system, information can be propagated from an end user to at least one of the VCIs in the system, between VCIs in the system, and/or between at least one of the VCIs in the system and an outbound request manager. In some embodiments, the outbound request manager can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. A group or plurality of similar elements or components may generally be referred to herein with a single element number. For example a plurality of reference elements 108-1, 108-2, and 108-3 may be referred to generally as 108. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a general logical diagram of an infrastructure according to previous approaches. The infrastructure may be a system 100, which may include an inbound load balancer 106 coupled to (e.g., in communication with) a plurality of cluster nodes 108-1, 108-2, and 108-3 (referred to generally herein as "cluster nodes 108"). Although FIG. 1 illustrates three cluster nodes 108-1, 108-2, and 108-3, the plurality of cluster nodes 108 may include any quantity of cluster nodes 108. The cluster nodes 108 may provide a service to clients 102. For example, the cluster nodes 108 may provide email functionality. In some embodiments, the cluster nodes 108 may be configured to selectively permit client login. In a number of embodiments, the cluster nodes 108 may be servers, such as file servers, print servers, communication servers (such as email servers), remote access servers, firewall servers, application servers, database servers, web servers, and others. The inbound load balancer 106 may be coupled to the clients 102 as illustrated by the line 104. Each of the cluster nodes 108 may be coupled to the inbound load balancer 106 as illustrated by the lines 110, 112, and 114. Each of the cluster nodes 108 may be coupled to an external service 116 as illustrated by the lines 118, 120, and 122. The lines 104, 110, 112, 114, 118, 120, and 122 are used for illustration purposes to represent communication between elements and not necessarily a physical connection between the elements.

As illustrated in FIG. 1, to protect the external service 116, the external service 116 may have explicit firewall rules to permit the network address of each of the cluster nodes 108 because each of the cluster nodes 108 is coupled to the external service 116. That is, the external service 116 may be firewalled to block attacks from any external network entity, and have a first firewall rule to permit the network address of the cluster node 108-1, a second firewall rule to permit the network address of the cluster node 108-2, and a third firewall rule to permit the network address of the cluster node 108-3. Thus, previous approaches to protecting the external service 116 while simultaneously making the external service 116 accessible to the cluster nodes 108 can be inefficient. For example, manual intervention may be needed to update the external service 116 in response to a change in one or more of the cluster nodes 108.

Figure 2:
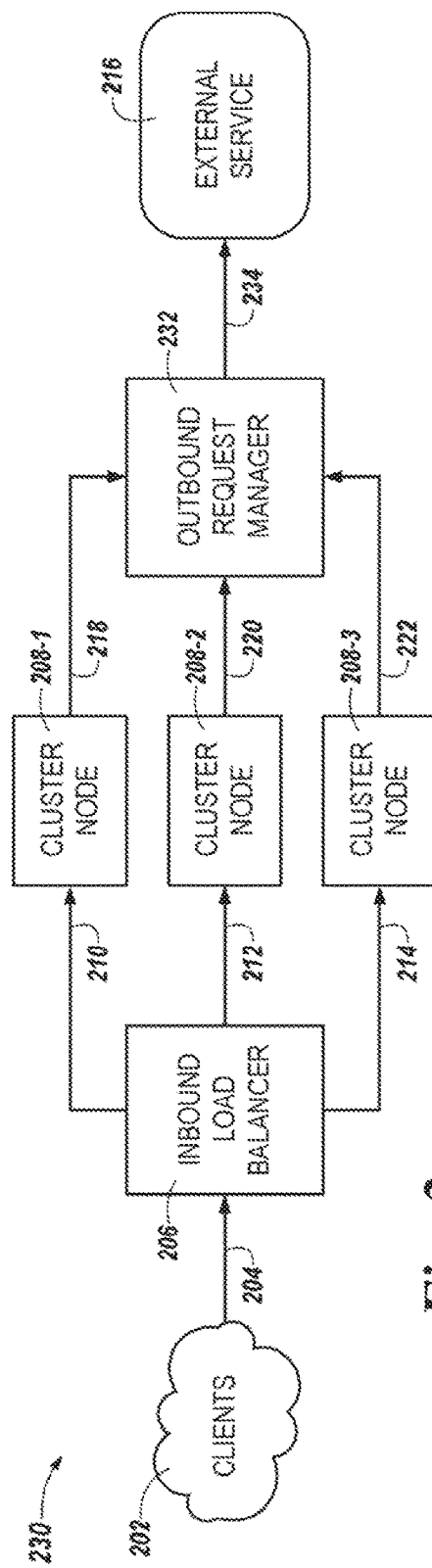
FIG. 2 is a general logical diagram of an example of an infrastructure for routing requests for an external service, originating from a plurality of cluster nodes, through an outbound request manager according to the present disclosure.

FIG. 2 is a general logical diagram of an example of an infrastructure for routing requests for an external service, originating from a plurality of cluster nodes, through an outbound request manager according to the present disclosure. The infrastructure can be a system 230 including outbound request management. The system 230 can include an inbound load balancer 206 coupled to (e.g., in communication with) a plurality of cluster nodes 208-1, 208-2, and 208-3 (referred to generally herein as "cluster nodes 208"). Although FIG. 2 illustrates three cluster nodes 208-1, 208-2, and 208-3, embodiments are not so limited such that the cluster nodes 208 can include any quantity of cluster nodes 208. The cluster nodes 208 may provide a service to clients 202. For example, the cluster nodes 208 can be servers, such as files servers, print servers, communication servers (such as email servers), remote access servers, firewall servers, application servers, database servers, web servers, and others. Embodiments herein are not intended to limit the cluster nodes 208 to a particular type and/or functionality.

In contrast to previous approaches and the system 100 illustrated in FIG. 1, each of the cluster nodes 208 can be coupled to an outbound request manager 232 as illustrated by the lines 218, 220, and 222. An example of the outbound request manager 232 is illustrated and described in more detail with respect to FIG. 3. The outbound request manager 232 can be coupled to the external service 216 as illustrated by the line 234. Thus, requests for the external service originating from any of the cluster nodes 208 (e.g., the cluster node 208-1) can be routed through the outbound request manager 232. The outbound request manager 232 can be configured to transmit requests for the external service 216 originating from any of the cluster nodes 208 to an address associated with the external service 216 such that the external service 216 identifies the requests as originating from a particular network address. That is, the external service 216 can identify a request as originating from the particular network address as opposed to a network address of the cluster node from which the request originated (e.g., the cluster node 208-1). Each of the cluster nodes 208 can have a different network address. The particular network address can be a virtual IP address different than an IP address of the outbound request manager 232. As used herein, a "virtual IP address" refers to an IP address that does not correspond to a physical network interface or port. In some embodiments, the outbound request manager 232 can be configured to hide the network address of any of the cluster nodes 232 via a network address translation (NAT). That is, the outbound request manager 232 can be configured to provide a NAT service such that network addresses of the cluster nodes 208 are hidden from the external service 216.

A benefit of routing requests for the external service 216 through the outbound request manager 232 can be that information associated with a first request originating from a first cluster node can be utilized with a subsequent, second request originating from a second cluster node. In contrast to previous approaches, such as that illustrated in FIG. 1 where each cluster node individually communicates with the external service, the outbound request manager 232 communicates with the external service 216 on behalf of the cluster nodes 208. Therefore, information cached by the outbound request manager 232 can be utilized such that the subsequent, second request for the external service 216 may not be transmitted to an address associated with the external service 216. In some embodiments, the outbound request manager 232 can be configured to cache, for the cluster nodes 208, information received in response to a request for the external service 216 originating from one of the cluster nodes 208. The outbound request manager 232 can be configured to utilize the cached information in response to receipt of a subsequent request for the external service 216 originating from a different one of the cluster nodes 208.

As an example, assume that the external service 216 is an authentication service. The outbound request manager 232 can receive a first request for authentication via the external service 216 originating from the cluster node 208-1. The outbound request manager 232 can be configured to cache the authentication associated with the first request originating from the cluster node 208-1. Subsequently, the outbound request manager 232 can receive a second request for authentication via the external service 216 originating from the cluster node 208-2. Instead of authenticating via the external service 216, the outbound request manager 232 can be configured to retrieve the cached authentication in response to the second request originating from the cluster node 208-2.

As another example, assume that the external service 216 is a DNS service. The outbound request manager 232 can receive a first request for a domain name associated with an IP address via the external service 216 originating from the cluster node 208-1. The outbound request manager 232 can be configured to cache the domain name associated with the first request originating from the cluster node 208-1. Subsequently, the outbound request manager 232 can receive a second request for a domain name associated with the same IP address via the external service 216 originating from the cluster node 208-2. Instead of requesting the domain name via the external service 216, the outbound request manager 232 can be configured to retrieve the cached domain name associated with the IP address in response to the second request originating from the cluster node 208-2.

Although FIG. 2 illustrates the system 230 including a standalone outbound request manager 232, embodiments are not so limited. In some embodiments, at least one of the cluster nodes 208 (e.g., the cluster node 208-2) can serve as the outbound request manager 232. For example, a request for the external service 216 originating from the cluster node 208-1 can be routed through the cluster node 208-2 serving as the outbound request manager 232. Serving as the outbound request manager 232, the cluster node 208-2 can assign a particular network address to a request for the external service 216 originating from the cluster node 208-1. The particular network address can be different than the network address of the cluster node 208-1, the cluster node 208-2 that is serving as the outbound request manager 232, and/or the network address of any of the cluster nodes 208. The cluster node 208-2, serving as the outbound request manager 232, can transmit the request with the particular network address to an address associated with the external service 216. The cluster node 208-2, serving as the outbound request manager 232, can assign the particular network address to each of a plurality of requests for the external service 216 originating from any of the cluster nodes 208 regardless of a quantity of the cluster nodes 208 or a quantity of the plurality of requests. The cluster node 208-2 serving as the outbound request manager 232 can transmit the plurality of requests to the address associated with the external service 216.

In some embodiments, the cluster node serving as the outbound request manager 232 can be a leader cluster node. As used herein, a "leader cluster node" refers to a cluster node that is an organizer, or coordinator, of a service. The service can be distributed amongst one or more cluster nodes. An example of a service organized by a leader cluster node can be, but is not limited to, routing requests for an external service, originating from a plurality of cluster nodes, through an outbound request manager. In some embodiments, the cluster node serving as the outbound request manager 232 can be predefined as the leader cluster node. In some embodiments, the cluster node serving as the outbound request manager 232 can be chosen randomly during the runtime of the cluster nodes 208. Because the leader cluster node takes on an additional role (e.g., serving as the outbound request manager), which can include additional processes and network connections, the leader cluster node can be susceptible to crashing. By randomly choosing the leader cluster node during the runtime of the cluster nodes 208, for example, randomly choosing a different leader cluster node every thirty minutes, the likelihood of the leader cluster node crashing can be greatly reduced. The leader cluster node can be one of the cluster nodes 208 with a greatest bandwidth.

In some embodiments, the cluster nodes 208 can elect the cluster's leader (e.g., the leader cluster node) for a particular service. That is, the cluster nodes 208 can communicate amongst themselves in order to decide which of the cluster nodes 208 will be the leader cluster node. For example, the leader cluster node can be one of the cluster nodes 208 with a greatest quantity of confidence votes from the cluster nodes 208. That is, the role of serving as the outbound request manager 232 can be transferred from a first cluster node (e.g., the cluster node 208-1) to a second cluster node (e.g., the cluster node 208-2) if the second cluster node 208-2 has a greater quantity of confidence votes than the first cluster node 208-1 even though previously the first cluster node 208-1 had the greatest quantity of confidence votes. The greatest number of confidence votes can be an indication of a cluster node's capacity, such as the bandwidth of the cluster node, to handle requests for the external service 216 originating from the cluster nodes 208 because the quantity of the cluster nodes 208 can be large; for example, a hundred cluster nodes. A benefit of determining the leader cluster node based on a quantity of confidence votes can be that the role of serving as the outbound request manager 232 is assigned dynamically to one of the cluster nodes 208 that, at a particular time, is best capable of serving as the outbound request manager 232 (e.g., has the greatest bandwidth) as opposed to a static predefined leader cluster node.

In contrast to the system 100 illustrated in FIG. 1, the external service 216 can have a single firewall rule permitting the particular network address. That is, the single firewall rule can permit the network address of the cluster node 208-1, the network address of the cluster node 208-2, and/or the network address of the cluster node 208-3. The external service 216 can be firewalled to block traffic from any source to avoid exposing the external service 216 to an attack vector, but permit traffic from the particular network address of the outbound request manager 232.

The inbound load balancer 206 can be coupled to the clients as illustrated by the line 204. Each of the cluster nodes 208 can be coupled to the inbound load balancer 206 as illustrated by the lines 210, 212, and 214. The inbound load balancer 206 can route inbound traffic from the clients 202 to one or more of the cluster nodes 208 that has the capacity to handle the inbound traffic. Although FIG. 2 illustrates the system 230 including the inbound load balancer 206, embodiments are not limited to systems that include an inbound load balancer. The lines 204, 210, 212, 214, 218, 220, 222, and 234 are used for illustration purposes to represent communication between elements and not necessarily a physical connection between the elements.

Figure 3:
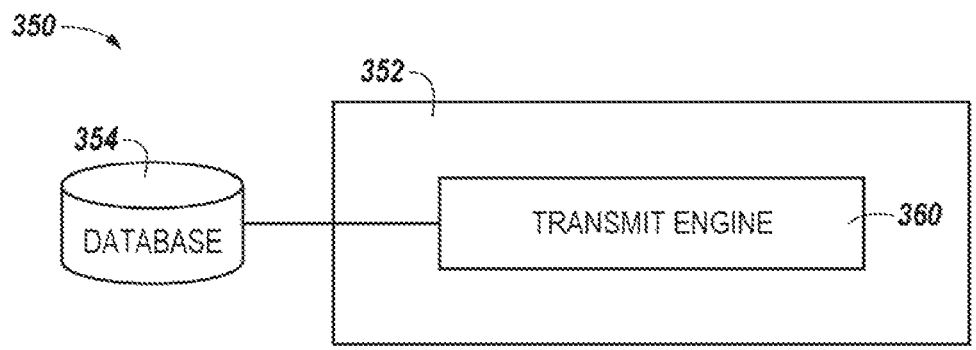
FIG. 3 is a diagram of a general logical system structure implementing routing requests for an external service, originating from a plurality of cluster nodes, through an outbound request manager according to the present disclosure.

FIG. 3 is a diagram of a general logical system structure implementing routing requests for an external service, originating from a plurality of cluster nodes, through an outbound request manager according to the present disclosure. The system 350 can include a database 354, a subsystem 352, and/or a number of engines, for example a transmit engine 360, and can be in communication with the database 354 via a communication link. The system 350 can include additional or fewer engines than illustrated to perform the various functions described herein. The system 350 can represent program instructions and/or hardware of a machine (e.g., machine 470 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The transmit engine 360 can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic such as in the form of an application specific integrated circuit) can be considered as both program instructions and hardware.

The transmit engine 360 can include a combination of hardware and program instructions that can be configured to transmit requests for an external service originating from any of a plurality of cluster nodes to an address associated with the external service such that the external service identifies the requests as originating from a particular network address. The particular network address can be a virtual IP address different than a primary IP address of the outbound request manager. The particular network address can be a network address of at least one of the plurality of cluster nodes serving as the outbound request manager.

In some embodiments, the transmit engine 360 can be configured to provide a network address translation (NAT) service such that network addresses of the plurality of cluster nodes are hidden from the external service. In some embodiments, the transmit engine 360 can be configured to cache an authentication associated with a previous request for the external service originating from one of the plurality of cluster nodes and retrieve the cached authentication in response to a subsequent request for the service originating from the one of the plurality of cluster nodes instead of authenticating via the external service.

Figure 4:
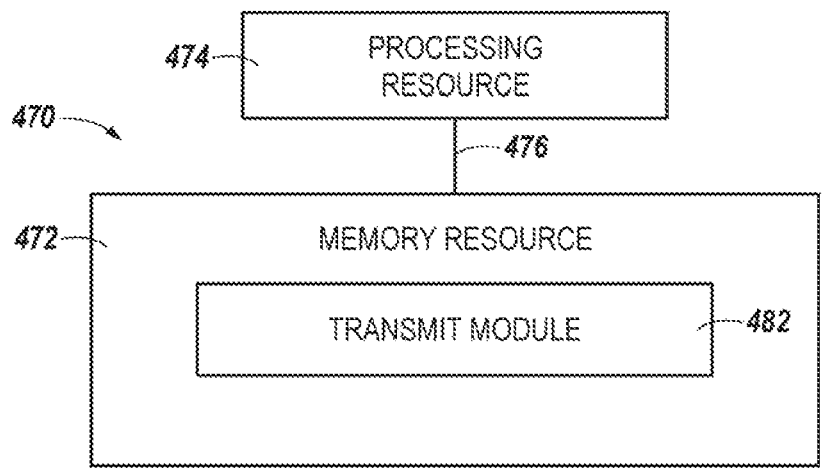
FIG. 4 is a diagram of an example system structure implementing routing requests for an external service, originating from a plurality of cluster nodes, through an outbound request manager according to the present disclosure.

FIG. 4 is a diagram of an example system structure implementing routing requests for an external service, originating from a plurality of cluster nodes, through an outbound request manager according to the present disclosure. FIG. 4 illustrates a machine 470 for routing requests for an external service, originating from a plurality of cluster nodes, through an outbound request manager. The machine 470 can utilize software, hardware, firmware, and/or logic to perform a number of functions. The machine 470 can be a combination of hardware and program instructions configured to perform a number of functions (e.g., actions). The hardware, for example, can include a number of processing resources 474 and a number of memory resources 472, such as a machine-readable medium (MRM) or other memory resources 472. The memory resources 472 can be internal and/or external to the machine 470 (e.g., the machine 470 can include internal memory resources and have access to external memory resources). In some embodiments, the machine 470 can be an outbound request manager, for example, analogous to the outbound request manager 232, previously discussed in connection with FIG. 2. The program instructions (e.g., machine-readable instructions (MRI)) can include instructions stored on the MRM to implement a particular function (e.g., an action such as issuing alerts to log sources). The set of MRI can be executable by one or more of the processing resources 474.

The memory resources 472 can be coupled to the machine 470 in a wired and/or wireless manner. For example, the memory resources 472 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 472 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 474 can be coupled to the memory resources 472 via a communication path 476. The communication path 476 can be local or remote to the machine 470. Examples of a local communication path 476 can include an electronic bus internal to a machine, where the memory resources 472 are in communication with the processing resources 474 via the electronic bus. Examples of such electronic buses can include Industry Standard Architecture (ISA), Peripheral Component Interconnect (PCI), Serial Advanced Technology Attachment (SATA), Small Computer System Interface (SCSI), Universal Serial Bus (USB), among other types of electronic buses and variants thereof. The communication path 476 can be such that the memory resources 472 are remote from the processing resources 474, such as in a network connection between the memory resources 472 and the processing resources 474. That is, the communication path 476 can be a network connection. Examples of such a network connection can include a local area network (LAN), wide area network (WAN), personal area network (PAN), and the Internet, among others.

As shown in FIG. 4, the MRI stored in the memory resources 472 can be segmented into a number of modules that when executed by the processing resources 474 can perform a number of functions. As used herein a module includes a set of instructions included to perform a particular task or action. The number of modules can be sub-modules of other modules. Furthermore, the number of modules can comprise individual modules separate and distinct from one another. Examples are not limited to the specific module 482 illustrated in FIG. 4.

Each of the number of modules can include program instructions and/or a combination of hardware and program instructions that, when executed by a processing resource 474, can function as a corresponding engine as described with respect to FIG. 3. For example, the transmit module 482 can include program instructions and/or a combination of hardware and program instructions that, when executed by a processing resource 474, can function as the transmit engine 360. The transmit module 482 can include instructions to assign a particular network address to a request for an external service originating from one of a plurality of cluster nodes, wherein the particular network address is different than a network address of any of the plurality of cluster nodes, hide the network address of any of the plurality of cluster nodes via a NAT, and transmit the request with the particular network address to an address associated with the external service.

In some embodiments, the transmit module 482 can include instructions to assign the particular network address to each of a plurality of requests for the external service originating from any of the plurality of cluster nodes regardless of a quantity of the plurality of cluster nodes or a quantity of the plurality of requests and transmit the plurality of requests to the address associated with the external service. In some embodiments, the transmit module 482 can include instructions to cache, for the plurality of cluster nodes, information received in response to the request. The transmit module 482 can include instructions to utilize the cached information in response to receipt of a subsequent request for the external service originating from a different one of the plurality of cluster nodes.

Figure 5:
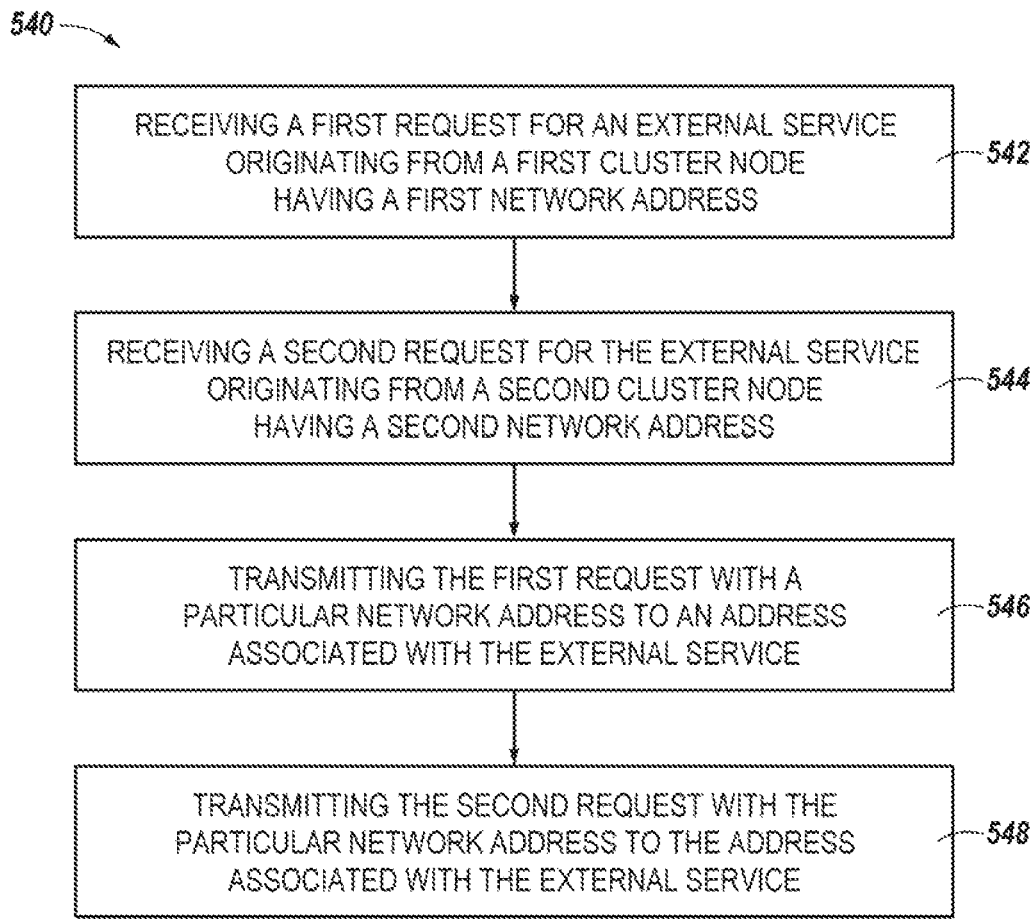
FIG. 5 is a flow chart illustrating a method for routing requests for an external service, originating from a plurality of cluster nodes, through an outbound request manager according to the present disclosure.

FIG. 5 is a flow chart illustrating a method for routing requests for an external service, originating from a plurality of cluster nodes, through an outbound request manager according to the present disclosure. At 542, the method 540 can include receiving a first request for an external service originating from a first cluster node having a first network address.

At 544, the method 540 can include receiving a second request for the external service originating from a second cluster node having a second network address.

At 546, the method 540 can include transmitting the first request with a particular network address to an address associated with the external service.

At 548, the method 540 can include transmitting the second request with the particular network address to the address associated with the external service In some embodiments, the method 540 can include caching information received in response to the first request and utilizing the cached information in response to receipt of the second request. The method 540 can include providing a service to clients via the first cluster node and the second cluster node. In some embodiments, the method 540 can include receiving a plurality of requests for the external service, including the first request and the second request, originating from a plurality of cluster nodes, including the first cluster node and the second cluster node and transmitting the plurality of requests with the particular network address from the plurality of cluster nodes to the address associated with the external service. In some embodiments, the method 540 can be performed by a third cluster node having a third network address.

In some embodiments, the method 540 can be performed by an outbound request manager coupled to the first cluster node and the second cluster node. For example, the first cluster node alone, the second cluster node alone, or the first cluster node and the second cluster node together can serve as the outbound request manager. The method 540 can include organizing NAT on the outbound request manager.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, by an outbound request manager coupled to a first cluster node, a second cluster node, and an external service, a first request for the external service originating from the first cluster node having a first network address;
receiving, by the outbound request manager, a second request for the external service originating from the second cluster node having a second network address;
transmitting, by the outbound request manager, the first and second requests with a third network address instead of the first and second network addresses to an address associated with the external service such that the external service is to identify the first request and second request as originating from the third network address, wherein the third network address is associated with the outbound request manager and is different than the first and second network addresses;
caching, by the outbound request manager, information received in response to the first and second requests;
receiving, by the outbound request manager, a third request for the external service originating from a third cluster node having a fourth network address; and
utilizing, by the outbound request manager, the cached information in response to the receipt of the third request for the external service, such that the third request for the external service is not transmitted to the address associated with the external service.

2. The method of claim 1, further comprising providing a service to clients via the first cluster node and the second cluster node.

3. The method of claim 1, further comprising organizing network address translation (NAT) on the outbound request manager.

4. The method of claim 1, wherein the method is performed by a fourth cluster node having the third network address that serves as the outbound request manager.

5. The method of claim 1, further comprising:
receiving, by the outbound request manager, a plurality of requests for the external service, including the first, request and the second request, originating from a plurality of cluster nodes, including the first cluster node and the second cluster node, wherein the outbound request manager is coupled to the plurality of cluster nodes; and
transmitting, by the outbound request manager, the plurality of requests with the third network address to the address associated with the external service.

6. A system, comprising:
a plurality of cluster nodes, wherein the plurality of cluster nodes provides a service to clients;
an outbound request manager coupled to the plurality of cluster nodes, wherein the outbound request manager comprises:
a processor; and
memory coupled to the processor, wherein the memory is configured to provide the processor with instructions that cause the processor to:
receive a first request for an external service originating from a first cluster node baying a first network address;
receive a second request for the external service originating from a second cluster node having a second network address;
transmit the first request and the second request for the external service to an address associated with the external service such that the external service identities the first request and the second request as originating from a third network address associated with the outbound request manager, wherein the third network address is different than the first and second network addresses;
cache an authentication associated with a previous request for the external service originating from one of the plurality of cluster nodes;
receive a subsequent request for the external service originating from the one of the plurality of cluster nodes having a fourth network address; and
retrieve the cached authentication in response to the subsequent request for the external service, such that the subsequent request for the external service is not transmitted to the address associated with the external service.

7. The system of claim 6, wherein each of the plurality or cluster nodes has a different network address.

8. The system of claim 6, wherein the third network address is a virtual Internet Protocol (IP) address different than a primary IP address of the outbound request manager.

9. The system of claim 6, wherein at least one of the plurality of cluster nodes serves as the outbound request manager.

10. The system of claim 9, wherein the third network address is a network address of at least one of the plurality of cluster nodes serving as the outbound request manager.

11. The system of claim 9, wherein the cluster node serving as the outbound request manager is a leader cluster node, wherein the leader cluster node is one of the plurality of cluster nodes with a greatest quantity of confidence votes from the plurality of cluster nodes.

12. The system of claim 9, wherein the cluster node serving as the outbound request manager is a leader cluster node, wherein the leader cluster node is one of the plurality of cluster nodes with a greatest bandwidth.

13. The system of claim 9, wherein the cluster node serving as the outbound request manager is predefined as a leader cluster node or chosen randomly during service runtime.

14. The system of claim 6, wherein the outbound request manager is further configured to provide a network address translation (NAT) service such that network addresses of the plurality of cluster nodes are hidden from the external service.

15. A non-transitory machine-readable medium storing instructions executable by a processing resource to cause a computing system to:
receive a first request for an external service originating from a first cluster node having a first network address;
receive a second request for the external service originating from a second cluster node having a second network address;
hide the first network address and the second network address via a network address translation (NAT);
transmit the first request and the second request for the external service with a third network address to an address associated with the external service such that the external service is to identify the first request and second request as originating from the third network address, wherein the third network address is associated with art outbound request manager and is different than the first and second network addresses;
cache, for a plurality of cluster nodes, information received in response to the first request and the second request for the external service;
receive a subsequent request for the external service originating from a different one of the plurality of cluster nodes having a fourth network address; and
utilize the cached information in response to the receipt of the subsequent request for the external service, such that the subsequent request for the external service is not transmitted to the address associated with the external service.

16. The medium of claim 15, wherein
the third network address is assigned to each of a plurality of requests for the external service originating from any of the plurality of cluster nodes regardless of a quantity of the plurality of cluster nodes or a quantity of the plurality of requests for the external service; and
transmit the plurality of requests for the external service with the third network address to the address associated with the external service.

* * * * *